United States Patent
Matsubara

(10) Patent No.: US 9,403,507 B2
(45) Date of Patent: Aug. 2, 2016

(54) VEHICULAR INTERIOR MEMBER ASSEMBLY AND VEHICULAR INTERIOR PART

(71) Applicant: TOYOTA BOSHOKU KABUSHIKI KAISHA, Aichi-ken (JP)

(72) Inventor: Kazuto Matsubara, Kariya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/751,624

(22) Filed: Jun. 26, 2015

(65) Prior Publication Data
US 2016/0001739 A1 Jan. 7, 2016

(30) Foreign Application Priority Data
Jul. 4, 2014 (JP) .................................. 2014-138561

(51) Int. Cl.
*B60R 13/02* (2006.01)
*B60R 22/34* (2006.01)
*B60R 22/18* (2006.01)

(52) U.S. Cl.
CPC .................. *B60R 22/34* (2013.01); *B60R 13/02* (2013.01); *B60R 2022/1818* (2013.01); *B60R 2022/3402* (2013.01)

(58) Field of Classification Search
CPC ........ B60R 22/34; B60R 22/24; B60R 22/08; B60R 22/4604; B60R 2022/3402; B60R 2022/1818; B60R 13/025; B60R 13/02; B60R 5/044; B60R 5/04
USPC ........................................ 280/807, 808, 801.1
See application file for complete search history.

(56) References Cited

U.S. PATENT DOCUMENTS

| 5,590,907 A * | 1/1997 | McQueen, II ........... B60R 22/24 280/801.1 |
| 2003/0222451 A1* | 12/2003 | Niimi .................... B60R 22/023 280/801.1 |
| 2009/0108577 A1* | 4/2009 | Hirotani .............. B60R 22/1951 280/802 |

FOREIGN PATENT DOCUMENTS

JP 2004-196263 7/2004

* cited by examiner

*Primary Examiner* — Keith Frisby
(74) *Attorney, Agent, or Firm* — Greenblum & Bernstein, P.L.C.

(57) ABSTRACT

A vehicular interior member assembly includes an interior member main body and an interior part mounted on the interior member main body to cover a seat belt retractor from a vehicular interior side. The interior part includes a main wall portion and a front wall portion extending from the main wall portion toward a vehicular exterior side and being in front of the seat belt retractor. The front wall portion includes a seat belt outlet that is through the front wall portion, and a guide portion on a side opening edge of the seat belt outlet and guiding the seat belt to the seat belt outlet when the interior part is attached to the interior member main body. The seat belt outlet has an elongated opening having a side opening that is open toward the vehicular exterior side.

16 Claims, 8 Drawing Sheets

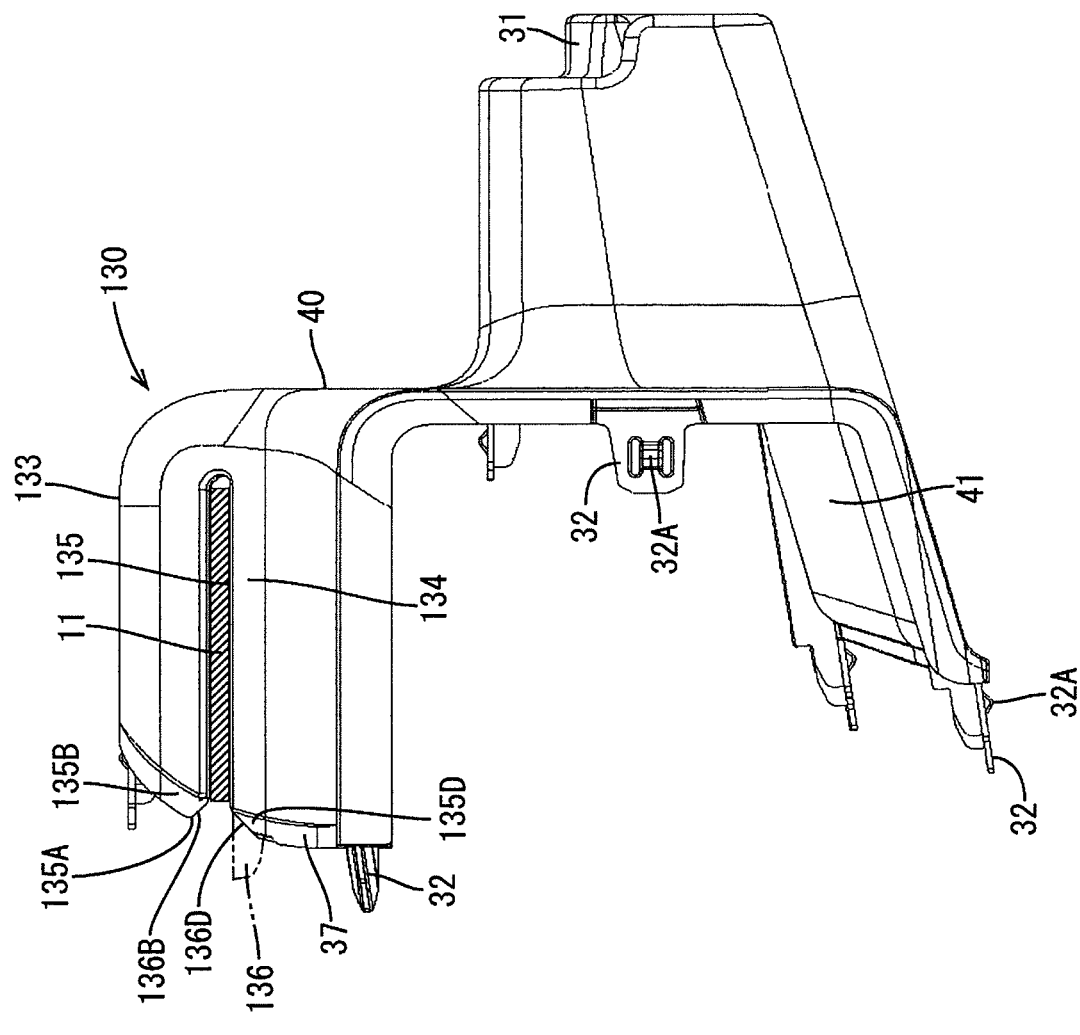

VEHICULAR INTERIOR MEMBER ASSEMBLY AND VEHICULAR INTERIOR PART

CROSS REFERENCE TO RELATED APPLICATION

This application claims priority from Japanese Patent Application No. 2014-138561 filed Jul. 4, 2014. The entire contents of the priority application are incorporated herein by reference.

FIELD OF THE INVENTION

The present disclosure relates to a vehicular interior member assembly and a vehicular interior part.

BACKGROUND

There has been a vehicular interior part that covers a retractor. The retractor retracts a seat belt. A rear quarter trim may be an example of such a vehicular interior part and the rear quarter trim includes a seat belt outlet and the seat belt drawn out from the retractor is drawn out through the seat belt outlet toward a vehicular front side.

In the above configuration, the vehicular interior part is generally mounted to cover the retractor after the seat belt and the retractor are mounted inside a vehicular compartment. Therefore, it is necessary to insert the seat belt through the seat belt outlet in the mounting operation of the vehicular interior part. There has been a demand of improving workability of such a mounting operation.

A worker may carry out the mounting operation without entering a vehicular compartment to shorten working time or avoid other parts that are previously mounted. In such a case, the worker carries out the mounting operation outside the vehicular compartment.

For example, after the retractor is previously mounted, the worker who is on a vehicular rear side with respect to the retractor may mount the vehicular interior part to cover the retractor. In such a case, the worker hardly sees the seat belt that is drawn out from the retractor toward the vehicular front side and it is quite difficult to insert the seat belt through the seat belt outlet.

SUMMARY OF THE INVENTION

An objective of the present technology is to provide a vehicular interior member assembly and a vehicular interior part with which the seat belt is easily inserted in the seat belt outlet in a mounting operation of the interior part included in a vehicular interior member.

According to the present technology, a vehicular interior member assembly includes an interior member main body that is a part of a vehicular side wall, and an interior part mounted on the interior member main body to cover a seat belt retractor from a vehicular interior side. The interior part includes a main wall portion and a front wall portion extending from the main wall portion toward a vehicular exterior side and being in front of the seat belt retractor. The front wall portion includes a seat belt outlet that is through the front wall portion in a vehicular front-rear direction, and a guide portion on the side opening edge of the seat belt outlet and guiding the seat belt to the seat belt outlet when the interior part is attached to the interior member main body. The seat belt drawn out from the seat belt retractor toward a vehicular front side is inserted in the seat belt outlet. The seat belt outlet has an elongated opening extending from a vehicular exterior side edge of the front wall portion toward a vehicular interior side edge of the front wall portion and the seat belt outlet has a side opening that is open toward the vehicular exterior side at the vehicular exterior side edge and has a side opening edge.

BRIEF DESCRIPTION OF THE DRAWINGS

FIG. 8 is a perspective view of a garnish according to a second embodiment.

DETAILED DESCRIPTION

First Embodiment

A first embodiment of the present technology will be described with reference to FIGS. 1 to 7. According to this embodiment, an assembly of a deck side trim 20 will be described as an example of a vehicular interior member assembly. The deck side trim 20 is on a vehicular rear side and is a side wall (a vehicular interior side wall) of a vehicular luggage room.

The deck side trim 20 is arranged on two sides of the vehicular luggage room with respect to a vehicular width direction. The deck side trim 20 that is arranged on a right side of a vehicle with respect to a vehicular running direction is illustrated in FIG. 1.

Figure 1:
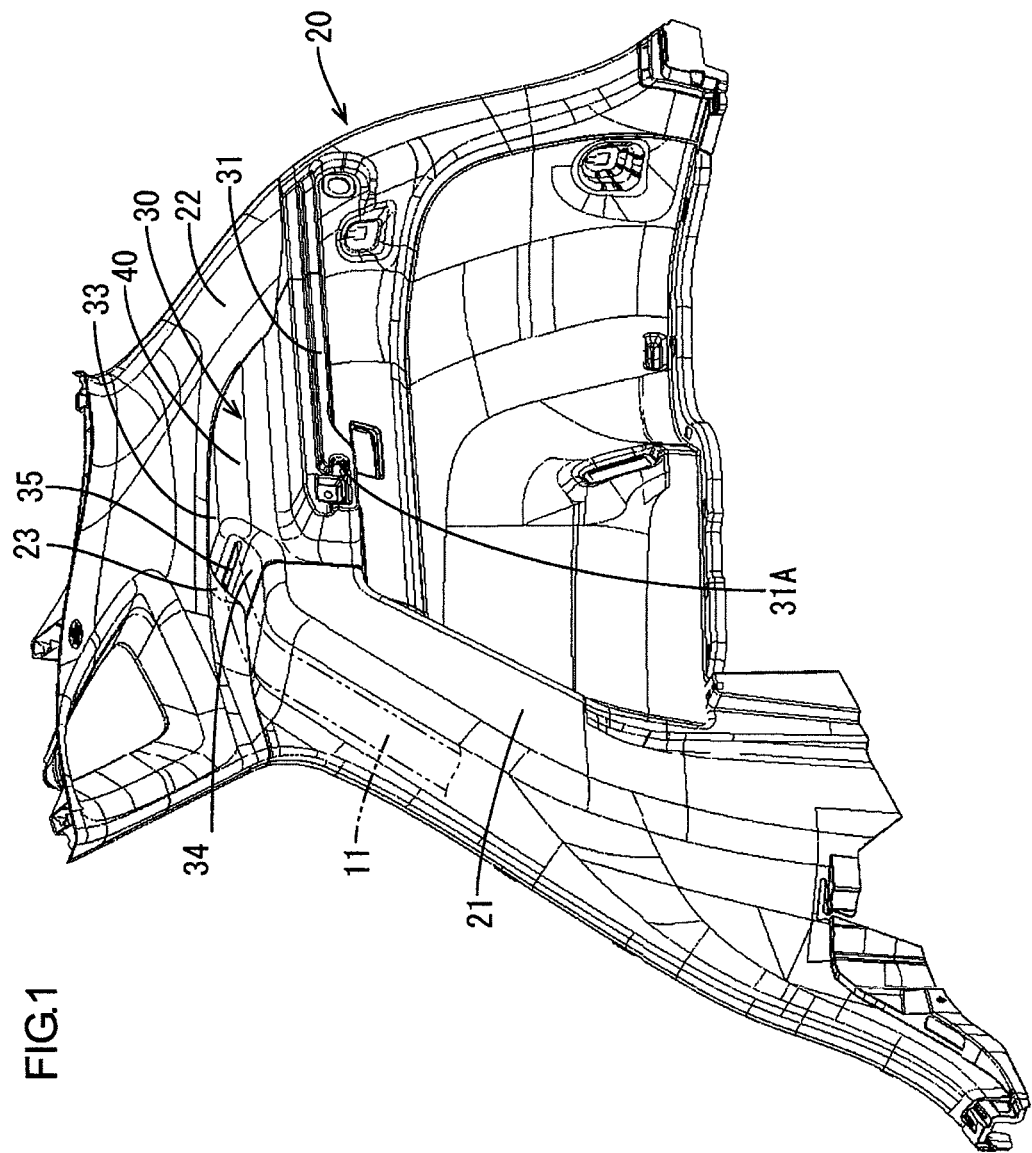
FIG. 1 is a perspective view of a deck side trim according to a first embodiment.
Figure 2:
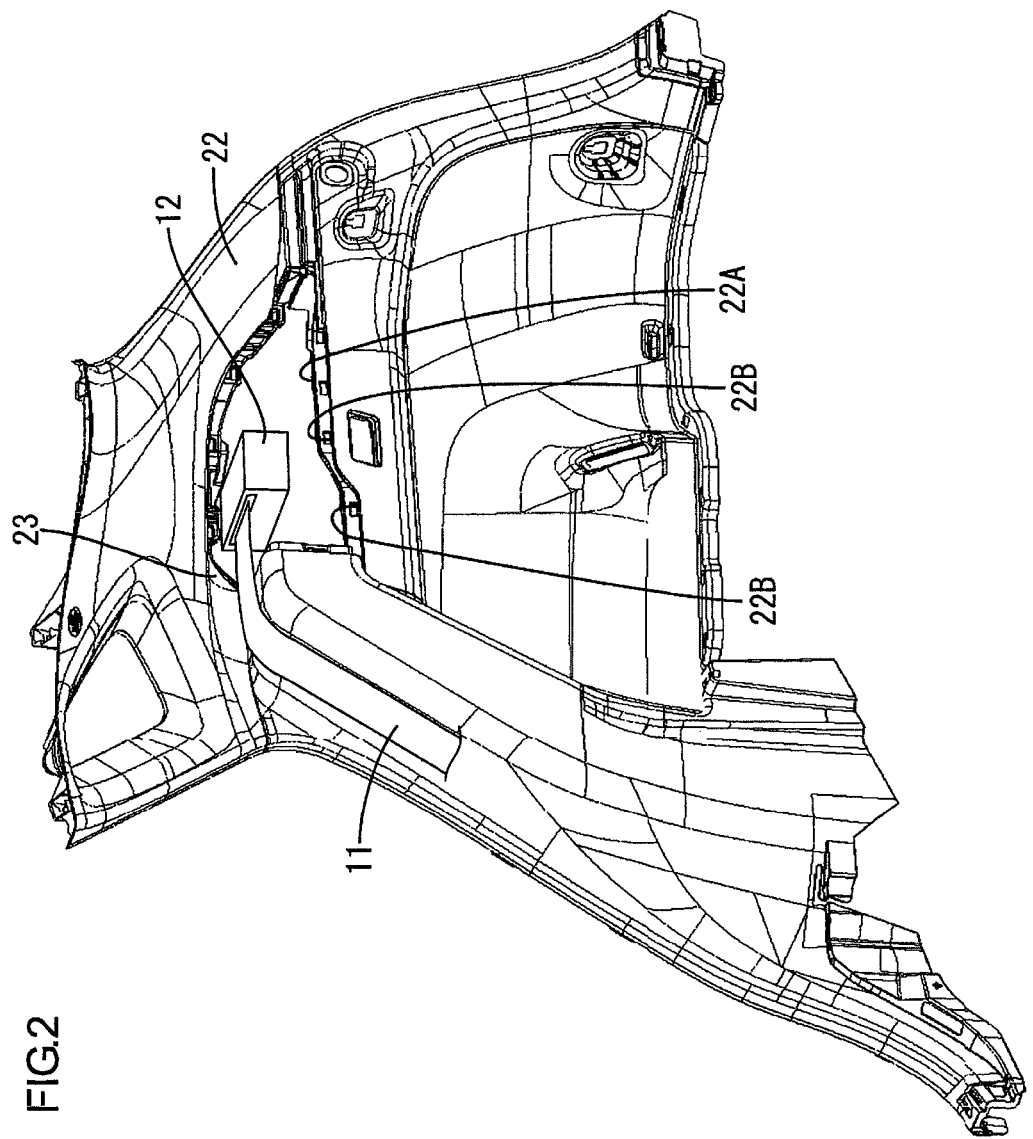
FIG. 2 is a perspective view of the deck side trim from which a garnish is detached.

As illustrated in FIGS. 1 and 2, the deck side trim 20 includes a trim main body 22 (an interior member main body, a first interior part) and a garnish 30 (an interior part, a second interior part). The trim main body 22 is a main part of the deck side trim 20. The garnish 30 is mounted on the trim main body 22 from a vehicular interior side.

Each of the trim main body 22 and the garnish 30 is formed from a plate. Each of the trim main body 22 and the garnish 30 is formed by molding a synthetic resin plate into a certain shape with press molding.

The trim main body 22 is arranged on a vehicular side panel (not illustrated) to cover the vehicular side panel from the vehicular interior side and is attached to the side panel with mounting means such as a clip (not illustrated). As illustrated in FIG. 1, the trim main body 22 includes a front wall portion 21 that projects further toward the vehicular interior side than a rear wall portion thereof. The front wall portion 21 extends downward as is closer to the vehicular front side.

As illustrated in FIG. 2, the trim main body 22 includes a mount through hole 22A in a middle portion thereof with respect to a vehicular front-rear direction. The mount through hole 22A is through the trim main body 22 in the vehicular width direction and covered with the garnish 30. The retractor 12 for the seat belt 11 is covered with the garnish 30 from the vehicular interior side.

The retractor 12 is mounted on the side panel, for example. As illustrated in FIG. 2, the retractor 12 is seen from the vehicular interior side through the mount through hole 22A with the garnish 30 being detached from the trim main body 22. The retractor 12 retracts the seat belt 11 and the seat belt 11 is drawn out from the retractor 12 toward the vehicular front side.

Figure 3:
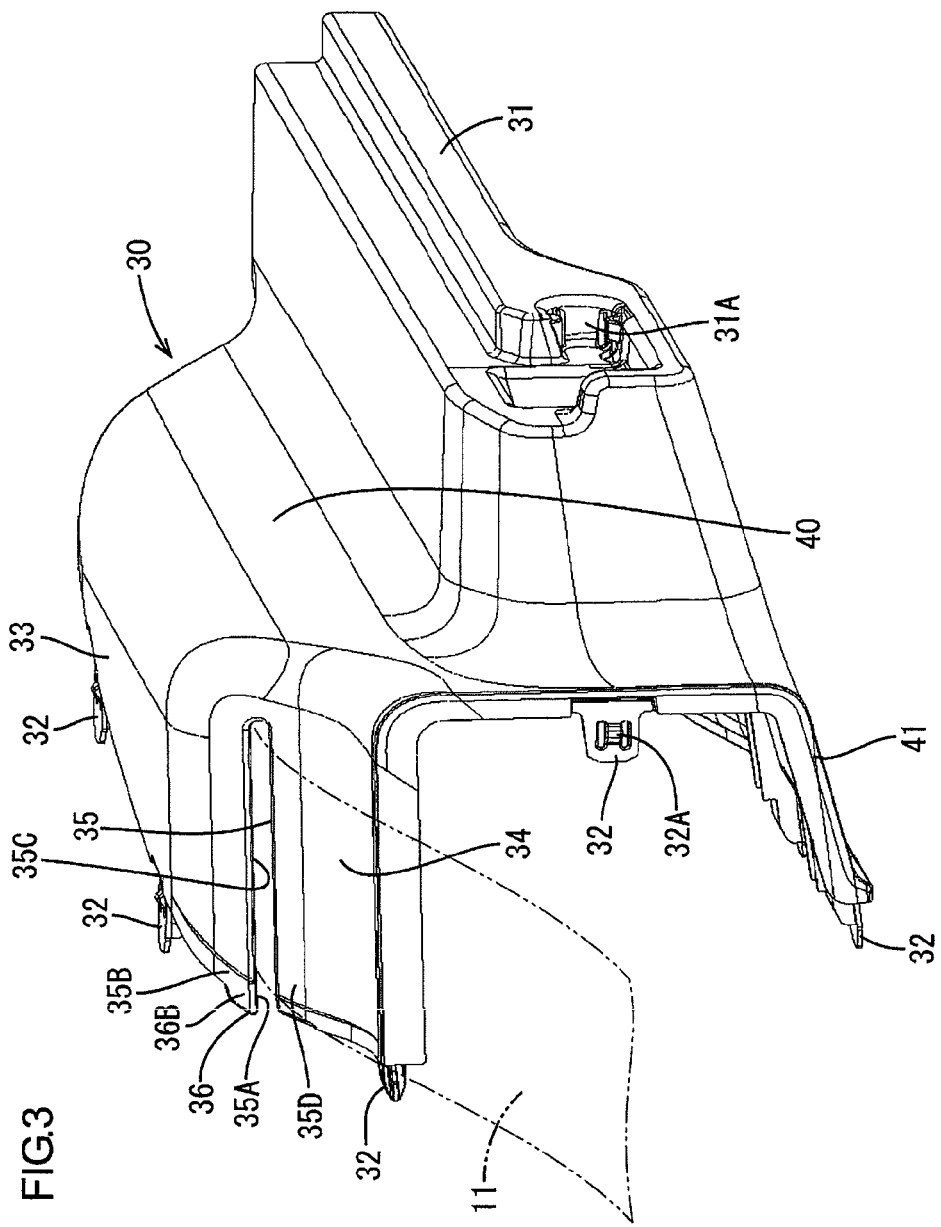
FIG. 3 is a perspective view of the garnish.
Figure 4:
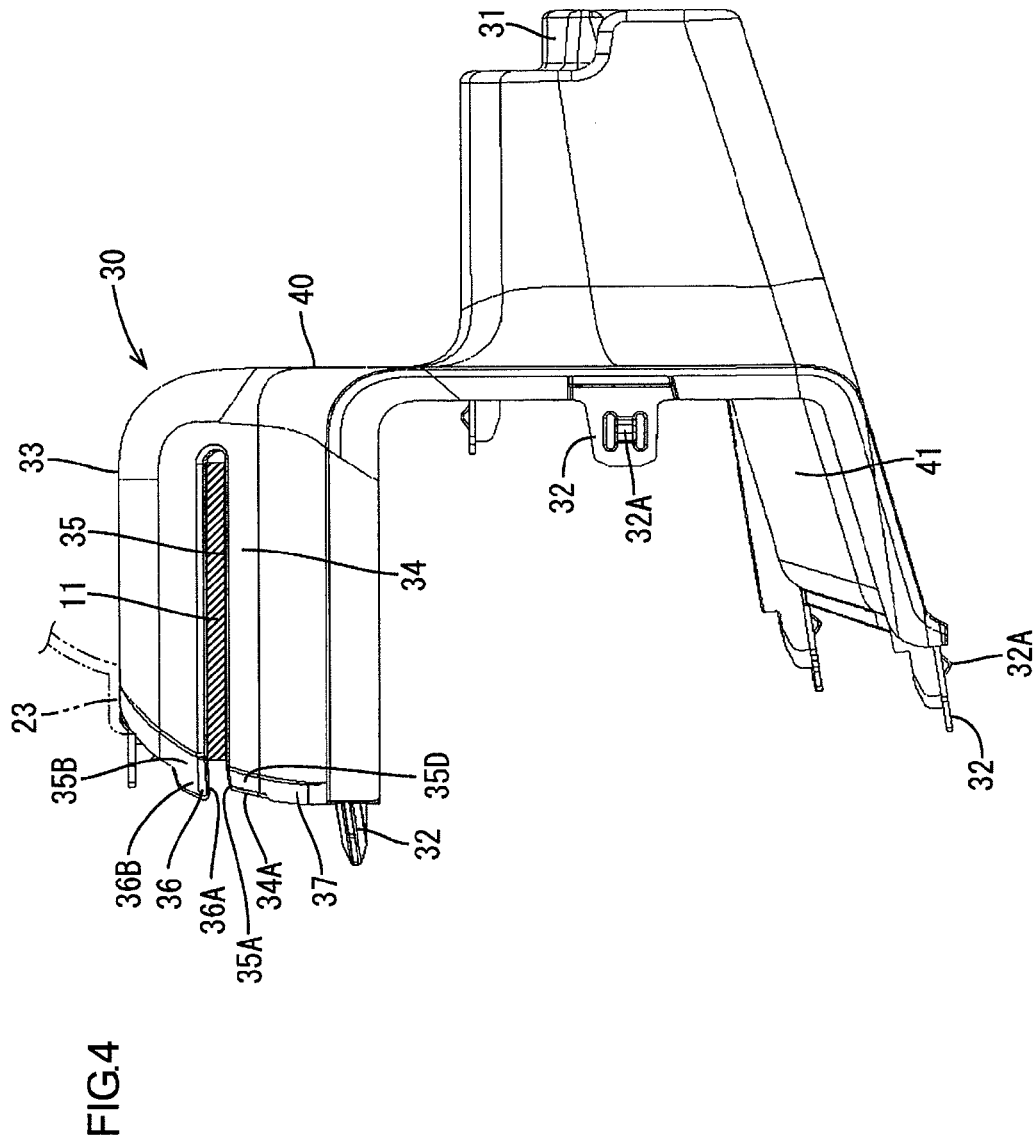
FIG. 4 is a front view of the garnish.

As illustrated in FIGS. 3 and 4, the garnish 30 (a deck side upper garnish) has a substantially box shape that is open to the vehicular exterior side. The garnish 30 includes a main wall portion 40, a front wall portion 34, an upper wall portion 33, and a lower wall portion 41. The main wall portion 40 covers the retractor 12 from the vehicular interior side. The front wall portion 34 extends from a vehicular front edge portion of the main wall portion 40 toward the vehicular exterior side. The upper wall portion 33 extends from an upper edge of the main wall portion 40 toward the vehicular exterior side. The lower wall portion 41 extends from a lower edge of the main wall portion 40 toward the vehicular exterior side.

Figure 5:
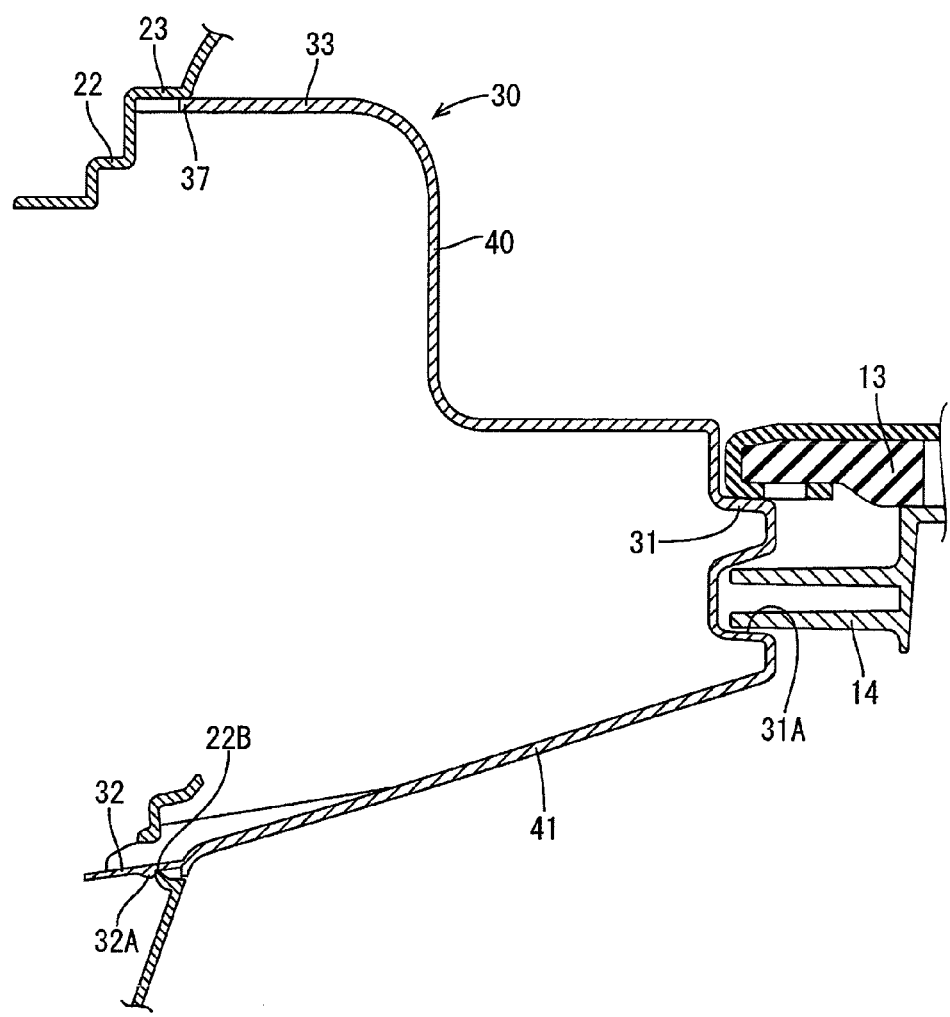
FIG. 5 is a cross-sectional view of the garnish.

The main wall portion 40 includes a lower portion that projects toward the vehicular interior side and includes a support portion 31 at a projected end thereof. As illustrated in FIGS. 4 and 5, the support portion 31 extends in the vehicular front-rear direction and supports a side edge portion of a tonneau board 13 from a lower side.

As illustrated in FIG. 3, the support portion 31 includes a mount recess portion 31A at a vehicular front end portion thereof. The mount recess portion 31A is open to the vehicular front side and the vehicular interior side. As illustrated in FIG. 5, a projection 14 formed on a rear surface of the tonneau board 13 is fitted in the mount recess portion 31A.

The tonneau board 13 includes the projection 14 at a side edge and a vehicular front edge thereof and the projection 14 projects toward the vehicular exterior side. According to this configuration, the tonneau board 13 is capable of pivoting around the projection 14.

As illustrated in FIG. 3, the garnish 30 includes edge mount portions 32 on vehicular exterior edges. As illustrated in FIG. 2, the mount through hole 22A of the trim main body 22 has a hole edge portion. The hole edge portion has through holes 22B (main body mount portions) corresponding to the edge mount portions 32.

The edge mount portions 32 are provided on the vehicular exterior edges of the upper wall portion 33, the front wall portion 34, and the lower wall portion 41. The edge mount portions 32 are provided on peripheral edges of the main wall portion 40.

As illustrated in FIG. 5, each of the edge mount portions 32 has a plate shape projecting toward the vehicular exterior side and is inserted through the corresponding through hole 22B from the vehicular interior side. Each of the edge mount portions 32 includes a projection 32A on one surface thereof.

The projections 32A are stopped by hole edges of the through holes 22B of the trim main body 22, respectively. The projections 32A are located on the vehicular exterior side with respect to the respective hole edges of the through holes 22B. Accordingly, the garnish 30 is attached to the trim main body 22.

When the projections 32A pass through the respective through holes 22B to attach the garnish 30 to the trim main body 22, the projections 32A are pushed by the respective hole edges of the through holes 22B. Accordingly, the edge mount portions 32 are elastically deformed toward an inner side of the garnish 30 so that the edge mount portions 32 pass through the respective through holes 22B.

The front wall portion 34 extends to be sloped downwardly as it is closer to the vehicular front side. The front wall portion 34 is located on the vehicular front side with respect to the retractor 12 and includes a seat belt outlet 35 in which the seat belt 11 is inserted. The seat belt outlet 35 is through the front wall portion 34 in the vehicular front-rear direction.

As illustrated in FIG. 4, the seat belt outlet 35 has a shape such that a part of the front wall portion 34 is cut off. The seat belt outlet 35 is a through hole and has an elongated front opening 35C extending from a vehicular exterior edge of the front wall portion 34 toward a vehicular interior edge (a right side in FIG. 4) and the seat belt outlet 35 is open toward the vehicular exterior side. Namely, the seat belt outlet 35 is a slit that is through the front wall portion 34 and extends from the vehicular exterior edge of the front wall portion 34 toward the vehicular interior side. The seat belt outlet 35 has a side opening 35A that is open toward the vehicular exterior side and the front opening 35C. According to such a configuration, the seat belt 11 is inserted through the side opening 35A of the seat belt outlet 35 from the vehicular exterior side. The seat belt outlet 35 is a through hole that is through the front wall portion 34 and open toward the vehicular exterior side.

The seat belt outlet 35 (the front opening 35C) has a length in the vehicular width direction that is greater than a width of the seat belt 11. The seat belt outlet 35 (the front opening 35C) has a width that is slightly greater than a thickness of the seat belt 11. According to such a configuration, as illustrated in FIGS. 1 and 4, the seat belt 11 is inserted in the seat belt outlet 35 such that a front-rear direction of the seat belt 11 corresponds to an up-down direction. Namely, the seat belt 11 is inserted in the seat belt outlet 35 such that a front surface thereof faces upward and a rear surface thereof faces downward.

As illustrated in FIG. 4, the seat belt outlet 35 has a side opening edge around the side opening 35A. The side opening edge includes an upper side opening edge 35B and a lower side opening edge 35D. The upper side opening edge 35B includes a projected portion 36 (a guide portion) that projects toward the vehicular exterior side. The projected portion 36 guides the seat belt 11 to the seat belt outlet 35 when the seat belt 11 is inserted in the seat belt outlet 35 through the side opening 35A.

The projected portion 36 included in the upper side opening edge 35B has a projected distal end that is on the vehicular exterior side with respect to the lower side opening edge 35D. The projected portion 36 has a lower surface 36A (see FIG. 4) and the lower surface 36A is flush with an inner surface of the seat belt outlet 35.

Figure 7:
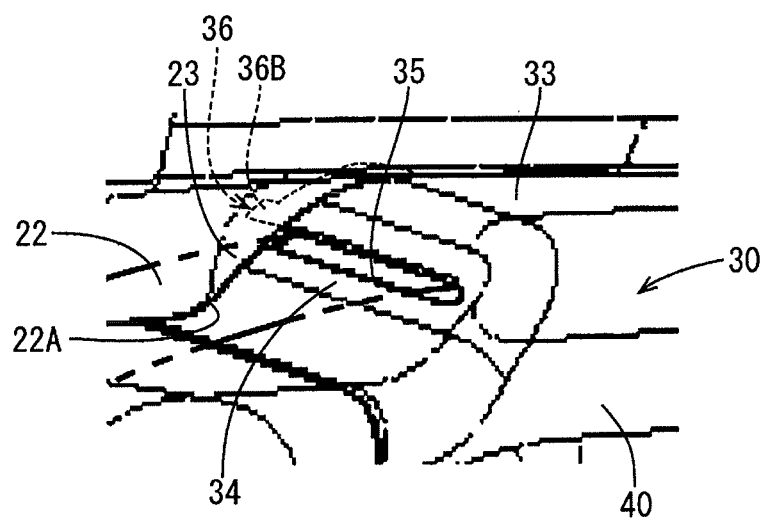
FIG. 7 is a perspective view illustrating a portion of the deck side trim in the vicinity of a seat belt outlet in FIG. 1.

As illustrated in FIG. 1, the mount through hole 22A of the trim main body 22 has a hole edge and the hole edge of the mount through hole 22A is a cover portion 23 that covers surfaces of vehicular interior side edge portions 37 (including the projected portion 36) of the upper wall portion 33 and the front wall portion 34. As illustrated in FIG. 5, the cover portion 23 has a step-like shape that is recessed toward the vehicular interior side and covers the edge portions 37 that are on the vehicular interior side with respect to the cover portion 23 from a front surface side of the edge portions 37. According to such a configuration, as illustrated in FIG. 7, the cover portion 23 covers a surface 36B of the projected portion 36 from the vehicular front side. The projected portion 36 is illustrated by a dotted line in FIG. 7.

Operations and advantageous effects of this embodiment will be described next. In this embodiment, when the garnish 30 is attached to the trim main body 22 from the vehicular interior side, the edge mount portions 32 of the garnish 30 are inserted in the respective mount through holes 22A of the trim main body 22.

Figure 6:
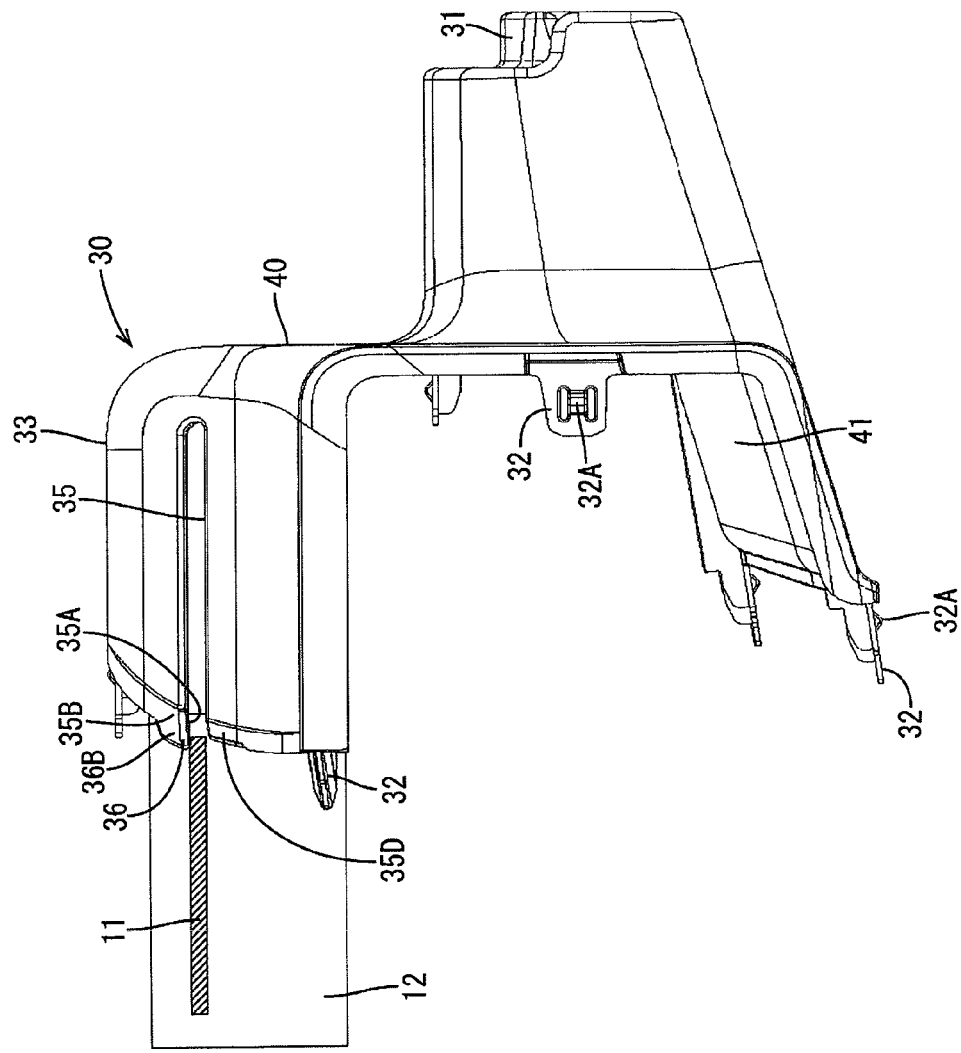
FIG. 6 is a cross-sectional view of the garnish during a mounting operation.

At the time of the insertion of the edge mount portions 32 into the respective mount through holes 22A, the seat belt 11 that is drawn out from the retractor 12 toward the vehicular front side is inserted in the seat belt outlet 35. As illustrated in FIG. 6, the worker moves the garnish 30 to be closer to the seat belt 11 from upward and the lower surface 36A of the projected portion 36 comes in contact with the upper surface of the seat belt 11.

Accordingly, the seat belt outlet 35 is positioned with respect to the seat belt 11 in a height direction and the seat belt outlet 35 is positioned on a same level as the seat belt 11. Then, the worker moves the garnish 30 laterally toward the vehicular exterior side so that the seat belt 11 is inserted in the seat belt outlet 35 through the side opening 35A (see FIG. 4).

Thus, at the time of the insertion of the seat belt 11 in the seat belt outlet 35, the edge mount portions 32 of the garnish 32 are inserted through the respective mount through holes 22A of the trim main body 22. Accordingly, the garnish 30 is attached to the trim main body 22 and the seat belt 11 is drawn out from the garnish 30 through the seat belt outlet 35 toward the vehicular front side.

According to this embodiment, the side opening edge of the seat belt outlet 35 includes the projected portion 36. The seat belt 11 is guided by the projected portion 36 to the seat belt outlet 35 and the seat belt 11 is easily inserted in the seat belt outlet 35.

If a worker attaches the garnish 30 to the trim main body 22 from a vehicular rear side of the vehicular luggage room, the front wall portion 34 of the garnish 30 is away from the worker and it is difficult for the worker to confirm the position of the seat belt 11 drawn out toward the vehicular front side and the position of the seat belt outlet 35. In this embodiment, the projected portion 36 fits the seat belt 11 in the attachment of the garnish 30 to the trim main body 22 and accordingly, the seat belt outlet 35 is positioned with respect to the seat belt 11 precisely and easily. Therefore, the attachment workability is improved.

The projected portion 36 is included in the upper side opening edge 35B of the opening edge of the seat belt outlet 35. According to such a configuration, the projected portion 36 is in contact with the seat belt 11 from upward with utilizing the weight of the garnish 30, and the workability is improved.

A part of the trim main body 22 is the cover portion 23 that covers the surface 36B of the projected portion 36.

According to such a configuration, the projected portion 36 is covered with the cover portion 23 by attaching the garnish 30 to the trim main body 22. Therefore, the projected portion 36 is not seen by the occupant and design properties are improved.

In this embodiment, the deck side trim 20 includes an independent component (the garnish 30) from the trim main body 22 for covering the retractor 12. The component that covers the retractor 12 is independent from the trim main body 22 and therefore, the independent component, which is the garnish 30, has a relatively small size. A worker easily positions the garnish 30 or the seat belt outlet 35 with respect to the seat belt 11 compared to a configuration that the trim main body and the garnish 30 are integrally formed.

Second Embodiment

Next, a second embodiment of this technology will be described with reference to FIG. 8. In this embodiment, components same as those in the first embodiment have same symbols or numerals and will not be described. In this embodiment, a garnish 130 has a guide portion that differs from that in the first embodiment.

The garnish 130 includes a front wall portion 134 having a seat belt outlet 135, a side opening 135A, an upper side opening edge 135B, and a lower side opening edge 135D. Corner portions of the upper opening edge 35B and the lower opening edge 35D are chamfered and are chamfered portions 136B, 136D (guide portions), respectively. An opening width of the side opening 135A is increased as is closer to the vehicular exterior side. Therefore, the side opening 135A has an opening width in the up-down direction that is greater than a thickness of the seat belt 11.

According to such a configuration, the seat belt 11 is put on one of the chamfered portions 136B, 136D to be easily guided to the seat belt outlet 135 when the seat belt 11 is inserted in the seat belt outlet 135 through the side opening 135A.

Other Embodiments

The present technology is not limited to the description as described above with reference to the drawings. For example, the present technology may include following embodiments.

(1) The vehicular interior member may be a seat side garnish.

(2) A lower opening edge of an opening may include a projected portion 136 as represented by a two-dot chain line in FIG. 8.

(3) In the above embodiments, the trim main body is used as the interior member main part and the garnish is used as the interior part. However, a board member that is a lower portion of a deck side trim may be used as the interior member main part and an upper portion of the deck side trim may be used as the interior part.

(4) In the above embodiments, the trim main body 22 may include a plurality of board members.

The invention claimed is:
1. A vehicular interior member assembly comprising:
an interior member main body that is a part of a vehicular side wall; and
an interior part mounted on the interior member main body to cover a seat belt retractor from a vehicular interior side, the interior part including:
a main wall portion; and
a front wall portion extending from the main wall portion toward a vehicular exterior side and being in front of the seat belt retractor, the front wall portion including:
a seat belt outlet that is through the front wall portion in a vehicular front-rear direction, the seat belt outlet in which the seat belt drawn out from the seat belt retractor toward a vehicular front side is inserted, the seat belt outlet having an elongated opening extending from a vehicular exterior side edge of the front wall portion toward a vehicular interior side edge of the front wall portion and the seat belt outlet having a side opening that is open toward the vehicular exterior side at the vehicular exterior side edge and has a side opening edge; and
a guide portion on the side opening edge of the seat belt outlet and guiding the seat belt to the seat belt outlet when the interior part is attached to the interior member main body.
2. The vehicular interior member assembly according to claim 1, wherein
the side opening edge of the seat belt outlet includes an upper side opening edge and a lower side opening edge,
the guide portion is on one of the upper side opening edge and the lower side opening edge, and
the guide portion is a projected portion projecting from the one of the upper side opening edge and the lower side opening edge toward the vehicular exterior side.

3. The vehicular interior member assembly according to claim 2, wherein the guide portion is on the upper side opening edge.

4. The vehicular interior member assembly according to claim 1, wherein the interior member main body includes a cover portion as a part thereof covering the guide portion from the vehicular front side.

5. The vehicular interior member assembly according to claim 1, wherein the seat belt outlet has a horizontally elongated slit that fits the seat belt.

6. The vehicular interior member assembly according to claim 1, wherein
the main wall portion extends in the vehicular front-rear direction, and has an upper edge, a lower edge, and a front edge,
the front wall portion extends from the front edge, and
the interior part further includes:
an upper wall extending from the upper edge of the main wall portion toward the vehicular exterior side; and
a lower wall extending from the lower edge of the main wall portion toward the vehicular exterior side.

7. The vehicular interior member assembly according to claim 6, wherein
the upper wall portion, the lower wall portion, and the front wall portion have exterior side edges and include edge mount portions, each of the exterior side edges includes at least one of the edge mount portions,
the interior member main body includes main body mount portions, and
the edge mount portions and the main body mount portions are mounted to each other.

8. The vehicular interior member assembly according to claim 6, wherein
the main wall portion includes a support portion on a vehicular interior side surface thereof, and
the support portion receives a tonneau board.

9. The vehicular interior assembly according to claim 1, wherein
the side opening has an opening width in an up-down direction, and the opening width is greater than a width of the seat belt.

10. A vehicular interior part to be mounted on a vehicular interior member main body to cover a seat belt retractor, the vehicular interior part comprising:
a main wall portion;
a front wall portion extending from the main wall portion toward a vehicular exterior side and to be in front of the seat belt retractor;
a seat belt outlet that is through the front wall portion in a vehicular front-rear direction, the seat belt outlet in which the seat belt drawn out from the seat belt retractor toward a vehicular front side is inserted, the seat belt outlet having an elongated opening extending from a vehicular exterior side edge of the front wall portion toward a vehicular interior side edge of the front wall portion and having a side opening that is open toward the vehicular exterior side at the vehicular exterior side edge and has a side opening edge; and
a guide portion on the side opening edge of the seat belt outlet and guiding the seat belt to the seat belt outlet when the interior part is attached to the interior member main body.

11. The vehicular interior part according to claim 10, wherein
the side opening edge of the seat belt outlet includes an upper side opening edge and a lower side opening edge,
the guide portion is on one of the upper side opening edge and the lower side opening edge, and
the guide portion is a projected portion projecting from the one of the upper side opening edge and the lower side opening edge toward the vehicular exterior side.

12. The vehicular interior part according to claim 11, wherein the guide portion is on the upper side opening edge.

13. The vehicular interior part according to claim 10, wherein
the main wall portion extends in the vehicular front-rear direction, and has an upper edge, a lower edge, and a front edge, and
the front wall portion extends from the front edge,
the vehicular interior part further includes:
an upper wall extending from the upper edge of the main wall portion toward the vehicular exterior side; and
a lower wall extending from the lower edge of the main wall portion toward the vehicular exterior side.

14. The vehicular interior part according to claim 13, wherein
the upper wall portion, the lower wall portion, and the front wall portion have exterior side edges and include edge mount portions, each of the exterior side edges includes at least one of the edge mount portions, and
the edge mount portions are to be mounted on main body mount portions included in the vehicular interior member main body.

15. The vehicular interior part according to claim 13, wherein
the main wall portion includes a support portion on a vehicular interior side surface thereof, and
the support portion receives a tonneau board.

16. The vehicular interior part according to claim 10, wherein
the side opening has an opening width in an up-down direction, and the opening width is greater than a width of the seat belt.

* * * * *